J. O. ELY.

Table-Knives.

No. 6,182. Reissued Dec. 22, 1874.

Witnesses,
Geo. H. Gourdy
Miles L. Peck.

Inventor
J. Olden Ely.
By James Shepard Atty.

THE GRAPHIC CO. PHOTO-LITH. 39 & 41 PARK PLACE, N.Y.

UNITED STATES PATENT OFFICE.

J. OLDEN ELY, OF CHICAGO, ILLINOIS, ASSIGNOR, BY MESNE ASSIGNMENTS, TO LANDERS, FRARY & CLARK, OF NEW BRITAIN, CONNECTICUT.

IMPROVEMENT IN TABLE-KNIVES.

Specification forming part of Letters Patent No. 49,246, dated August 8, 1865; reissue No. 6,182, dated December 22, 1874; application filed July 7, 1874.

*To all whom it may concern:*

Be it known that I, J. O. ELY, of Chicago, in the county of Cook and State of Illinois, have invented an Improvement in Table and other Knives; and I do hereby declare the following to be a full, clear, and exact description of the same, reference being had to the accompanying drawing and to the letters of reference marked thereon.

My invention consists in the simple, efficient, and inexpensive mode, fully described hereafter, of casting and securing bolsters to table and other knives, and of securing the handles to the blades of the same.

Figure 1:
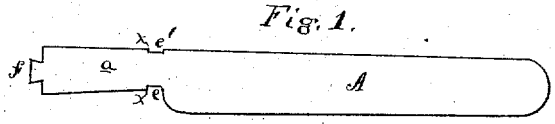
Figure 2:
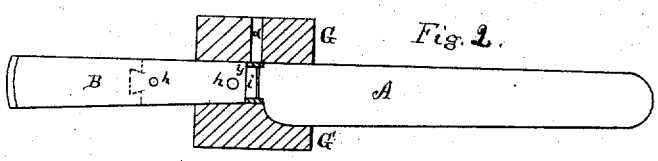
Figure 3:
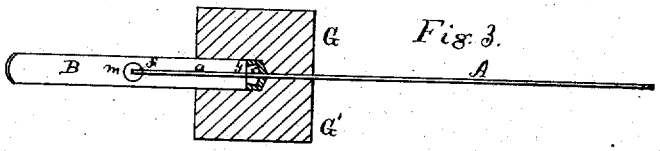
Figure 4:
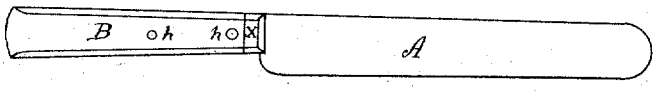
Figure 5:
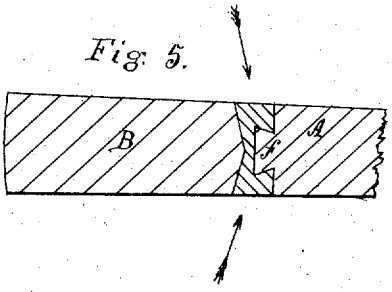
Figure 6:
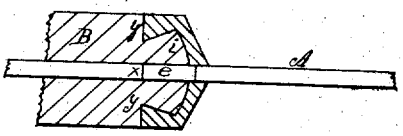
Figure 7:
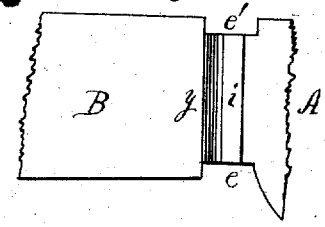

On reference to the accompanying drawing, which forms a part of this specification, Figure 1 represents a flat piece of steel, comprising the blade and tang of the knife; Figs. 2 and 3, views illustrating the manner of casting the bolster to the blade and tang; Fig. 4, a view of the knife completed; Fig. 5, a sectional view, illustrating the mode of securing the end of the tang to the handle; Figs. 6 and 7, sectional views of part of the blade, tang, and handle drawn to an enlarged scale.

Similar letters refer to similar parts throughout the several views.

The blade A and its tang *a* are cut or punched from a piece of steel to the form represented in Fig. 1; suitable means, as the two notches *e e*, being made, one in each edge of the steel strip, at the point where the blade meets the tang, and the latter terminating in a projection, *f*, of a dovetailed or other equivalent form, for a purpose described hereafter. The handle B may be made of wood, ivory, or other material usually employed for the purpose. The handle here represented is divided to receive the tang.

A divided handle requires that each of its divisions be firmly secured at or near the bolster. In order that both of these divisions of the handle may be firmly united to the tang by means of the bolster, it is of value that the bolster be mechanically united to the tang at both of its edges by means of the recesses or notches in the edges of the tang. In order that the bolster may properly encircle the tang, and, while solidly embracing it, to also present a flush back finish, it is essential that recesses at each edge of the tang be provided, as described.

A portion of the handle, at the front end of the same, is reduced in size, so as to form a projection, *i*, of the dovetailed shape best observed on reference to the enlarged views, Figs. 6 and 7. After the blade of the knife has been properly ground and polished the tang is inserted into the slot of the handle, care being taken to so adjust the blade that the ends *x x* of the notches *e e*, Fig. 1, are in line with the shoulders *y y*, Fig. 6, formed by the projections *i* of the handle, to which the tang is now secured by rivets *h h*, or by the mode which I will describe hereafter, or by both. The knife is now removed to a mold composed of two pieces, G and G′, (shown in Figs. 2 and 3,) which is arranged to inclose a portion of the handle and blade, there being in the mold a space of a form corresponding to that of the desired bolster X, for the reception of molten metal or alloy, which is poured through an orifice, *d*, the alloy being such that it will melt at a comparatively low temperature, and yet be hard and tough when cool. The two portions of the mold are now taken apart and the knife with its bolster X removed.

It will be observed that this bolster incloses the dovetailed projection *i* of the handle and penetrates the notches *e* and *e′* of the blade, which is thus firmly secured to the handle, inasmuch as any attempt to withdraw the blade from the bolster must be resisted by that portion of the latter which has penetrated the notches, and any attempt to withdraw the bolster from the handle must be resisted by the dovetailed projection *i*. At the same time the bolster forms a neat finish at the point where the handle and blade meet.

The tang is secured to the handle by means of rivets *h h*, and additional security is afforded by the peculiar manner, which I will now proceed to describe, of securing the dovetailed end of the tang to the handle. I bore through the handle hole *m*, not straight, but in the inclined direction pointed out by the arrows, Fig. 5, the hole being bored first into one edge and then into the other edge of the handle, and communicating with the slot which receives the tang. This hole is so situated as to receive the dovetailed end *f* of the tang, and is of such dimensions that there shall be a space between the interior of the hole and the said dovetailed end of the tang, into which space I pour molten metal, which, when cool, cannot be removed from the hole, owing to the peculiar shape of the same, while the dovetailed projection prevents the tang from being forced from the metal which surrounds it.

I am aware that before my invention a combined solid metal handle and bolster have been cast around a tang, and also that such cast-metal handle has been mechanically secured to the blade by means of a notch cut on the back of the blade, into which the metal composing the handle flowed in casting. In my invention, however, the bolster only is cast around the tang, close to the heel of the blade, the knife or fork being provided with a divided or other suitable handle, distinct from the bolster; and in order to secure such bolster firmly to the tang it is necessary to mechanically secure it to both edges of the tang, and this I accomplish by employing a notch on both edges, as described.

I claim as my invention and desire to secure by Letters Patent—

1. The improvement in the manufacture of cutlery which consists in the combination, with a tang, of a metal bolster cast around the tang, and mechanically held thereto by means of a notch at each edge of the tang, into which the metal of the bolster flows in casting, substantially as described.

2. In combination with the handle B and the blade A, the metal bolster X, cast around the tang or heel of the blade and the end of the handle, substantially as described.

J. OLDEN ELY.

Witnesses:

JOHN MATTICKS,

CHARLES O. HEUTHORN.